Aug. 16, 1938.   R. H. LEHEW   2,127,038
PAN LIFTER
Filed Jan. 9, 1937
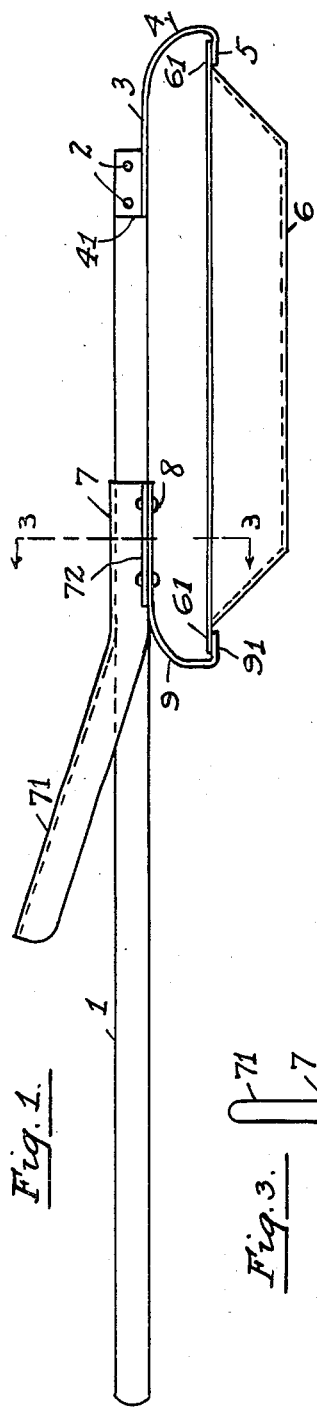
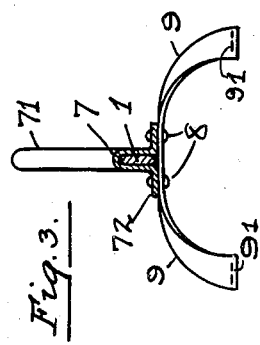
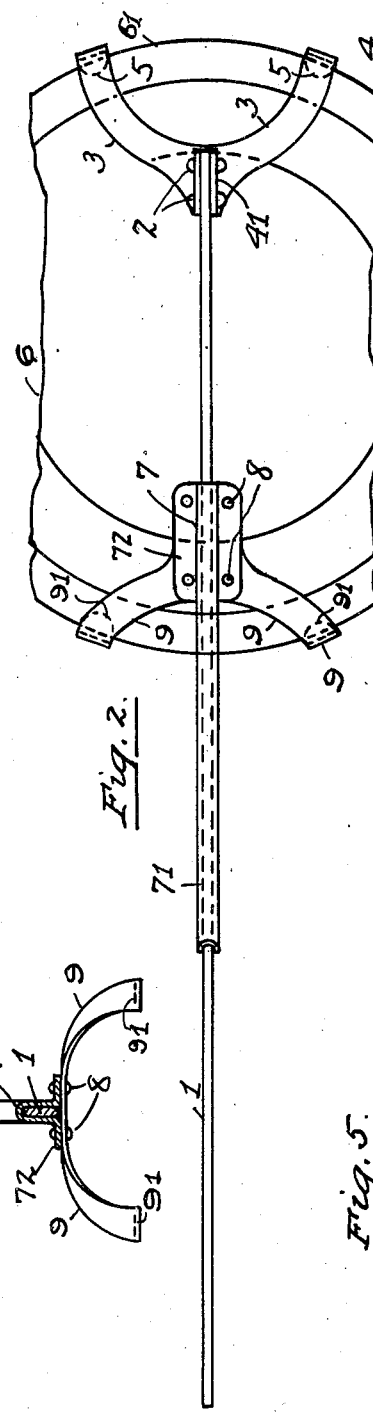
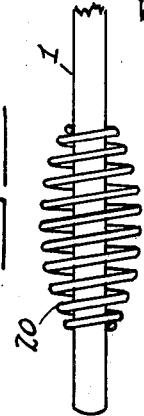
Inventor—
Robert H. Lehew Patented Aug. 16, 1938

2,127,038

UNITED STATES PATENT OFFICE 2,127,038

PAN LIFTER

Robert H. Lehew, Highland Park, Mich.

Application January 9, 1937, Serial No. 119,713

1 Claim. (Cl. 294—34)

My invention relates to pan lifters, and its principal object is to provide a device by which pie tins, pans, and other utensils may be removed from and replaced in an oven without danger of burning or discomfort to the hands such as is frequently caused by attempting to handle such utensils in the ordinary manner.

In order that my invention may be readily understood by those skilled in the art to which it relates, I will now describe a preferred embodiment of the same with reference to the accompanying drawing, in which—

Figure 1 is a side elevation of my improved device.

Figure 2 is a plan view of the same.

Figure 3 is a transverse section on line 3—3 of Figure 1.

Figure 4 shows a simplified form of my device in which three lifting jaws are employed instead of four as in Figures 1, 2 and 3.

Figure 5 illustrates a modified form of handle which may be used in connection with my device.

Like characters designate corresponding parts throughout the several views.

Referring more particularly to Figures 1, 2 and 3 of the drawing, I designates the main member or stem of the device, preferably formed from stainless steel, and in general of rectangular cross section, as shown. The length of this member will vary according to the depth of the oven in connection with which it is to be used, but in any case will be of sufficient length to reach to the extreme inner end of the oven and at the same time to provide a portion extending outside of the same and adapted to be held with comfort by the hand of the operator.

Fixed to the end of the stem I by rivets 2, or alternatively by spot-welding, are a pair of arcuate members 3, the free extremities of which are bent downwards as indicated at 4 and terminate in inwardly extending jaws 5, the said jaws being adapted to engage the underside of the peripheral flange 6I of a utensil such as the pie dish 6 shown. Vertically disposed flanges 4I serve to form a convenient means of connection of the members 3 to the stem I. Slidably mounted on the stem I is a member 7, in general of inverted U-shape having a rearwardly extending portion 7I adapted to form a handle and provided with outwardly extending flanges 72 to which is connected as by rivets 8, or other convenient means, an arcuate member 9 whose extremities extend outwardly and rearwardly and are provided with jaws 9I, similar in shape to the jaws 5, and adapted to engage the underside of the flange 6I of the utensil 6.

Thus, by sliding the member 7 along the stem I, the distance between the jaws 5 and the jaws 9I may be adjusted according to the diameter of the utensil to be handled, the adjustment being such as to cover a very wide range in the size of the utensils.

In the modified form of my device illustrated in Figure 4, the member 7, instead of carrying a pair of jaws 9I, has a single member 92 and a centrally disposed jaw 10I which will in many cases serve the same purpose as hereinbefore outlined in regard to the two jaws 9I.

I may sometimes provide the extreme rear ends of the stem I and on the handle 7I with wooden or other gripping portions, or alternatively they may be provided with handles 20 of the well known helical construction as shown in Figure 5 as applied to the stem I.

While I have herein described and illustrated a preferred embodiment of my invention, it will be understood that the design may be modified in various ways to suit particular requirements without departing from the spirit of my invention as defined in the appended claim, but in all cases the slidable portion of the device is of such construction that its handle and the main stem may together be gripped with one hand so as to frictionally lock the said member against movement.

Having thus described my said invention, what I claim and desire to secure by Letters Patent of the United States is:

A device of the character described comprising a stem formed from flat material disposed in a vertical plane having one end adapted to form a handle and the other end provided with a jaw adapted to engage the periphery of a utensil to be handled; a member of U-shaped cross section slidably engaging said stem and having a pair of laterally projecting ears arranged in the plane of the lower edge of said stem, one end of said member having a handle extending in a direction upwardly and angularly divergent from said stem; and a transverse bar having its central portion secured to said ears so as to maintain said U-shaped member in engagement with said stem and having its ends formed as jaws arranged in co-operative relation with said first-mentioned jaw, the said bar being relatively short in the direction of the stem's axis, whereby downward pressure upon the handle of the U-shaped member produces a frictional action tending to grip the stem and prevent longitudinal displacement of said last-named member.

ROBERT H. LEHEW.